US012561362B2

(12) United States Patent
　　Ozeki

(10) Patent No.: US 12,561,362 B2
(45) Date of Patent: Feb. 24, 2026

(54) INFORMATION PROCESSING APPARATUS, INFORMATION PROCESSING METHOD, AND PROGRAM

(71) Applicant: FUJIFILM Corporation, Tokyo (JP)

(72) Inventor: Makoto Ozeki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/909,921

(22) Filed: Oct. 8, 2024

(65) Prior Publication Data

US 2025/0028755 A1　　Jan. 23, 2025

Related U.S. Application Data

(63) Continuation of application No. PCT/JP2023/011774, filed on Mar. 24, 2023.

(30) Foreign Application Priority Data

Apr. 18, 2022　(JP) ................................. 2022-068504

(51) Int. Cl.
　　*G06F 16/532*　　(2019.01)
　　*G06F 16/538*　　(2019.01)
　　*G06F 16/583*　　(2019.01)
(52) U.S. Cl.
　　CPC .......... *G06F 16/532* (2019.01); *G06F 16/538* (2019.01); *G06F 16/5846* (2019.01)
(58) Field of Classification Search
　　CPC ... G06F 16/532; G06F 16/538; G06F 16/5846
　　USPC ................................................. 707/769, 770
　　See application file for complete search history.

(56) References Cited

U.S. PATENT DOCUMENTS

| | | | |
|---|---|---|---|
| 10,275,869 B2 | 4/2019 | Yamagishi et al. | |
| 2007/0005571 A1 | 1/2007 | Brewer et al. | |
| 2007/0208699 A1* | 9/2007 | Uetabira | ............... G06F 16/951 |
| 2009/0076774 A1* | 3/2009 | Miyajima | ............ G08G 1/0104 |
| | | | 702/179 |

(Continued)

FOREIGN PATENT DOCUMENTS

| | | |
|---|---|---|
| JP | 2009500719 | 1/2009 |
| WO | 2017056804 | 4/2017 |

OTHER PUBLICATIONS

"International Search Report (Form PCT/ISA/210) of PCT/JP2023/011774," mailed on Apr. 25, 2023, with English translation thereof, pp. 1-5.

(Continued)

*Primary Examiner* — Baoquoc N To
(74) *Attorney, Agent, or Firm* — JCIPRNET

(57) ABSTRACT

Provided are an information processing apparatus, an information processing method, and a program that enable effective use of a search result by obtaining a reliability degree for the search result. In an information processing apparatus (10) including a processor, the processor is configured to: acquire a search query; acquire a first search result of search performed based on the search query on a database; acquire meta-information of the search query; acquire a second search result of search performed based on the search query on the database which is filtered by the meta-information; and obtain a reliability degree of the first search result based on the second search result.

15 Claims, 13 Drawing Sheets

(56)             References Cited

U.S. PATENT DOCUMENTS

| | | | |
|---|---|---|---|
| 2016/0092551 A1* | 3/2016 | Tang ..................... | G06F 16/313 |
| | | | 707/740 |
| 2021/0174934 A1* | 6/2021 | Kilmer ................ | A61B 5/0022 |
| 2021/0231747 A1* | 7/2021 | Yamada ................ | G01R 31/52 |

OTHER PUBLICATIONS

"Written Opinion of the International Searching Authority (Form PCT/ISA/237) of PCT/ JP2023/011774," mailed on Apr. 25, 2023, with English translation thereof, pp. 1-6.

* cited by examiner

| | SPECIFICATIONS | | | DAMAGE INFORMATION | | | | REPAIR INFORMATION | PERIPHERAL INFORMATION | | DAMAGE IMAGE |
|---|---|---|---|---|---|---|---|---|---|---|---|
| ELAPSED YEARS | STRUCTURAL FORM | MEMBER NAME | MATERIAL | DAMAGE TYPE | DEGREE OF DAMAGE | SOUNDNESS DEGREE | COUNTERMEASURE CATEGORY | PAST REPAIR CONTENTS | WEATHER INFORMATION | STATISTICAL INFORMATION | |
| ⋮ | ⋮ | ⋮ | ⋮ | ⋮ | ⋮ | ⋮ | ⋮ | ⋮ | | | |
| ⋮ | ⋮ | ⋮ | ⋮ | ⋮ | ⋮ | ⋮ | ⋮ | ⋮ | | | |
| ⋮ | ⋮ | ⋮ | ⋮ | ⋮ | ⋮ | ⋮ | ⋮ | ⋮ | | | □ |
| ⋮ | ⋮ | ⋮ | ⋮ | ⋮ | ⋮ | ⋮ | ⋮ | ⋮ | | | □ |
| ⋮ | ⋮ | ⋮ | ⋮ | ⋮ | ⋮ | ⋮ | ⋮ | ⋮ | | | □ |
| ⋮ | ⋮ | ⋮ | ⋮ | ⋮ | ⋮ | ⋮ | ⋮ | ⋮ | | | □ |

42

43

FIRST SEARCH RESULT

SECOND SEARCH RESULT

INFORMATION PROCESSING APPARATUS, INFORMATION PROCESSING METHOD, AND PROGRAM

CROSS-REFERENCE TO RELATED APPLICATIONS

The present application is a Continuation of PCT International Application No. PCT/JP2023/011774 filed on Mar. 24, 2023 claiming priority under 35 U.S.C § 119 (a) to Japanese Patent Application No. 2022-068504 filed on Apr. 18, 2022. Each of the above applications is hereby expressly incorporated by reference, in its entirety, into the present application.

BACKGROUND OF THE INVENTION

1. Field of the Invention

The present disclosure relates to an information processing apparatus, an information processing method, and a program.

2. Description of the Related Art

In the related art, a facility manager requests a construction consultant to perform tasks such as inspections, and an inspector with specialized knowledge conducts inspections of various structures (also referred to as architectural structures, constructions, constructed structures, or infrastructure) such as bridges, roads, tunnels, dams, and buildings.

In WO2017/056804A, a first inspection result is acquired, a second inspection result is searched for from a database based on an image feature included in the first inspection result, a specific inspection result corresponding to a construction condition is searched for from the searched second inspection result, and the specific inspection result is preferentially displayed on a display unit.

SUMMARY OF THE INVENTION

Meanwhile, in recent years, there has been an increasing demand for inspections by non-experts due to rising costs and a shortage of labor. However, there are cases where a search precision for a search result acquired by executing a search query is low, and the search result includes items with low relevance to a search target. Therefore, it is not easy for a non-expert to use the search result.

The present invention has been made in view of such circumstances, and an object of the present invention is to provide an information processing apparatus, an information processing method, and a program that enable effective use of a search result by obtaining a reliability degree for the search result.

According to a first aspect, there is provided an information processing apparatus comprising a processor, in which the processor is configured to: acquire a search query; acquire a first search result of search performed based on the search query on a database; acquire meta-information of the search query; acquire a second search result of search performed based on the search query on the database which is filtered by the meta-information; and obtain a reliability degree of the first search result based on the second search result.

In the information processing apparatus according to a second aspect, the processor is configured to acquire the second search result of search performed based on the search query on the database which is filtered stepwise by the meta-information.

In the information processing apparatus according to a third aspect, the processor is configured to calculate a similarity in a case of obtaining the reliability degree.

In the information processing apparatus according to a fourth aspect, the processor is configured to, in a case of obtaining the reliability degree, calculate the similarity based on a method selected from the group of cosine similarity, deviation pattern similarity, Jaccard coefficient, Dice coefficient, Simpson coefficient, Pearson correlation coefficient, Spearman correlation coefficient, Earth Mover's Distance, Euclidean distance, weighted Euclidean distance, Hamming distance, Mahalanobis distance, or Canberra distance.

In the information processing apparatus according to a fifth aspect, the processor is configured to, in a case of obtaining the reliability degree, obtain statistical information for the first search result or the second search result based on the first search result or the second search result, and determine whether the statistical information is within a range of a threshold value.

In the information processing apparatus according to a sixth aspect, the processor is configured to output the reliability degree.

In the information processing apparatus according to a seventh aspect, the processor is configured to feed back the reliability degree to the acquisition of the first search result.

In the information processing apparatus according to an eighth aspect, the meta-information includes information about a structure.

In the information processing apparatus according to a ninth aspect, the information about the structure in the meta-information includes at least one selected from the group of a damage image, specifications, damage information, repair information, peripheral information, weather information, and statistical information.

In the information processing apparatus according to a tenth aspect, the search query includes information about a structure.

In the information processing apparatus according to an eleventh aspect, the information about the structure in the search query includes at least one selected from the group of a damage image, specifications, damage information, repair information, peripheral information, weather information, and statistical information.

According to a twelfth aspect, there is provided an information processing method executed by a processor, the method comprising: acquiring a search query; acquiring a first search result of search performed based on the search query on a database; acquiring meta-information of the search query; acquiring a second search result of search performed based on the search query on the database which is filtered by the meta-information; and obtaining a reliability degree of the first search result based on the second search result.

According to a thirteenth aspect, there is provided a program for executing an information processing method executed by a processor, the program causing the processor to execute: acquiring a search query; acquiring a first search result of search performed based on the search query on a database; acquiring meta-information of the search query; acquiring a second search result of search performed based on the search query on the database which is filtered by the meta-information; and obtaining a reliability degree of the first search result based on the second search result.

According to the present invention, by obtaining the reliability degree of the search result, the search result can be effectively used.

BRIEF DESCRIPTION OF THE DRAWINGS

FIG. 4 is a diagram showing a database stored in the storage unit.

DESCRIPTION OF THE PREFERRED EMBODIMENTS

Hereinafter, preferred embodiments of an information processing apparatus, an information processing method, and a program according to the present invention will be described with reference to the accompanying drawings. In the present specification, the term "structure" includes a construction, for example, a civil engineering structure such as a bridge, a tunnel, and a dam, and also includes an architectural structure such as a building, a house, or a wall, a pillar, or a beam of a building.

Figure 1:
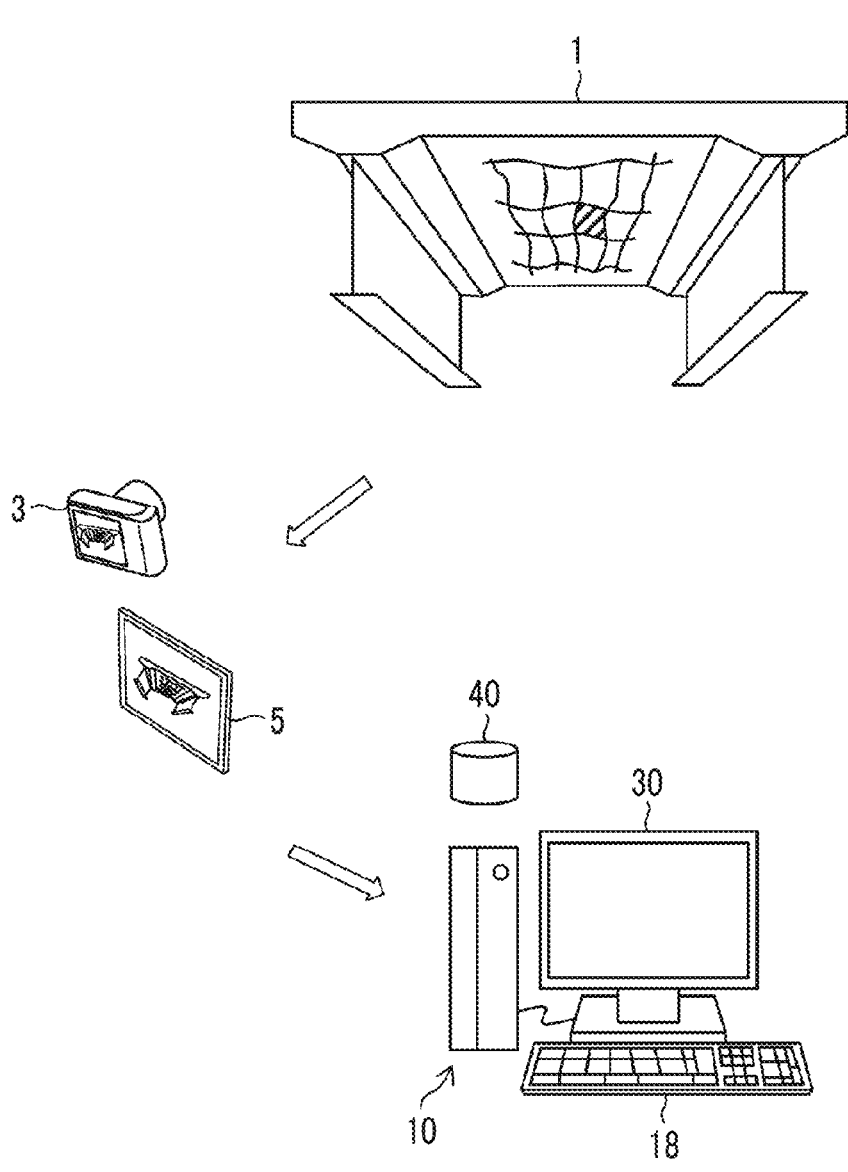
FIG. 1 is a schematic diagram of an information processing apparatus.

FIG. 1 is a schematic diagram of an information processing apparatus 10. The information processing apparatus 10 is connected to an operation unit 18 and a display device 30. As shown in FIG. 1, a user obtains an inspection result of a structure 1 via a camera 3 or a mobile terminal 5.

Various mobile terminals having imaging and information input functions, such as smartphones, tablet terminals, and portable personal computers, are suitably used as the mobile terminal 5.

The user inputs a search query based on an inspection result into the information processing apparatus 10 via the operation unit 18. The information processing apparatus 10 acquires the input search query. The information processing apparatus 10 acquires a first search result of search performed based on the search query on a database 40. The database 40 includes, for example, past inspection results related to the structure.

The information processing apparatus 10 acquires meta-information of the search query and acquires a second search result of search performed based on the search query on the database 40 which is filtered by the meta-information.

Next, the information processing apparatus 10 obtains a reliability degree of the first search result based on the second search result. Further, the information processing apparatus 10 displays the first search result and the reliability degree on the display device 30.

Hereinafter, the present embodiment will be described in detail.

[Hardware Configuration of Information Processing Apparatus]

Figure 2:
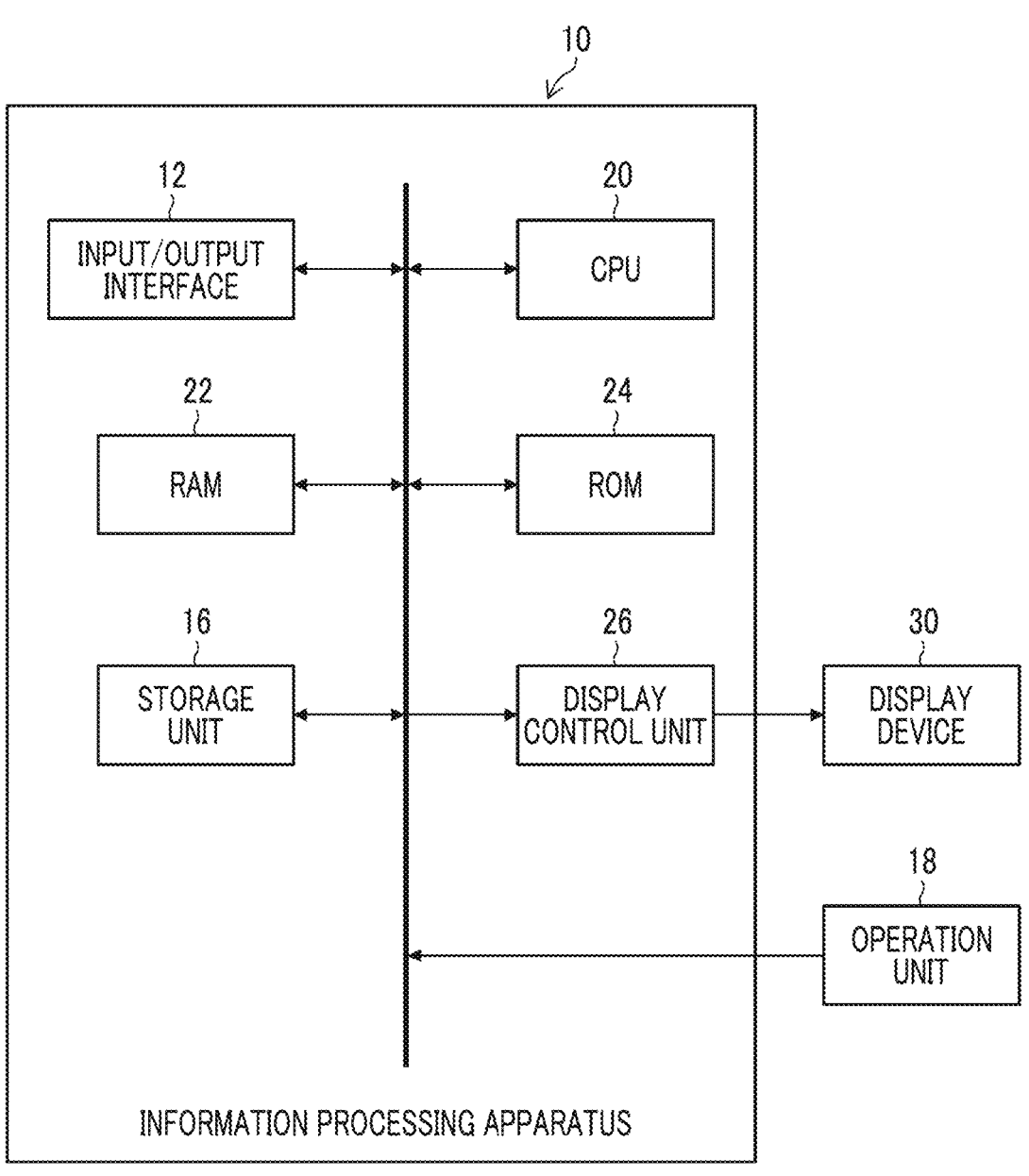
FIG. 2 is a block diagram showing an example of a hardware configuration of the information processing apparatus.

FIG. 2 is a block diagram showing an example of a hardware configuration of the information processing apparatus according to the embodiment.

As the information processing apparatus 10 shown in FIG. 2, a computer or a workstation can be used. The information processing apparatus 10 mainly includes an input/output interface 12, a storage unit 16, the operation unit 18, a central processing unit (CPU) 20, a random access memory (RAM) 22, a read only memory (ROM) 24, and a display control unit 26. The display device 30 that constitutes a display is connected to the information processing apparatus 10. Under a command of the CPU 20, the display device 30 displays various types of information through control of the display control unit 26.

The input/output interface 12 can input various data (information) into the information processing apparatus 10. For example, data stored in the storage unit 16 is input via the input/output interface 12.

The CPU (processor) 20 executes various types of processing of the information processing apparatus 10 by reading out various programs stored in the storage unit 16, the ROM 24, or like, and loading these programs into the RAM 22 to perform calculations.

Figure 3:
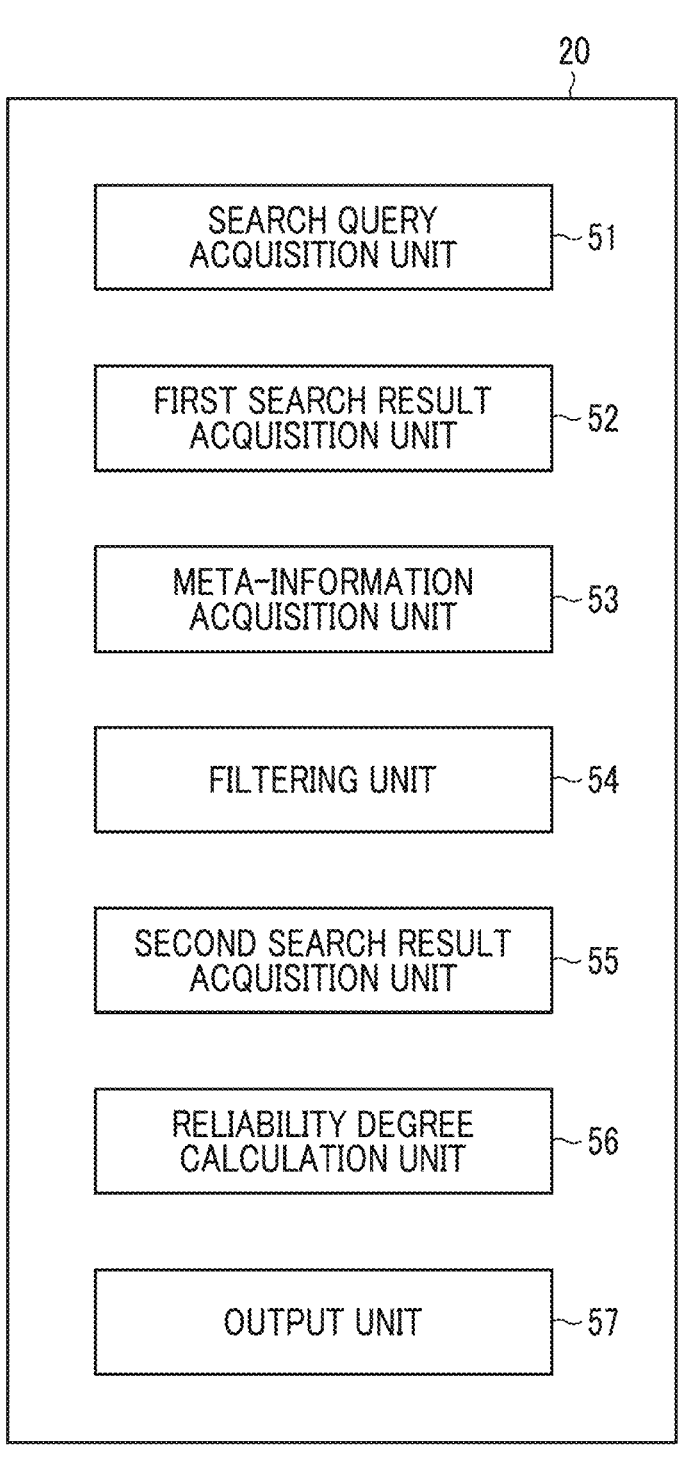
FIG. 3 is a block diagram showing processing functions realized by a CPU.

FIG. 3 is a block diagram showing processing functions realized by the CPU 20.

The CPU 20 mainly comprises a search query acquisition unit 51, a first search result acquisition unit 52, a meta-information acquisition unit 53, a filtering unit 54, a second search result acquisition unit 55, a reliability degree calculation unit 56, and an output unit 57, and executes processing of each unit. The processing functions of the respective units will be described below.

Returning to FIG. 2, the storage unit (memory) 16 is composed of a non-transitory storage medium, such as a hard disk device and various semiconductor memories, and a control unit for the non-transitory storage medium. The storage unit 16 stores programs for operating the information processing apparatus 10, such as an operating system and a program for executing an information processing method. Further, the storage unit 16 stores information and the like used in the embodiment described below.

The operation unit 18 includes a keyboard and a mouse, and the user can cause the information processing apparatus 10 to perform necessary processing via these devices. By using a touch panel type device, the display device 30 and the operation unit 18 can be combined.

The display device 30 is, for example, a device such as a liquid crystal display and displays various types of information from the information processing apparatus 10.

FIG. 4 is a diagram for describing the database 40 stored in the storage unit 16. In the embodiment, the database 40 includes inspection data 41 which is an inspection result of the structure obtained from past inspections.

As shown in FIG. 4, the inspection data 41 includes information on the structure, for example, at least one selected from the group of "specifications", "damage information", "repair information", "peripheral information", "weather information", "statistical information", and "damage image". The "specifications", the "damage information", the "repair information", the "peripheral information", the "weather information", and the "statistical information" are text data 42, and the "damage image" is image data 43. In addition, the inspection data 41 may further include text data such as "inspection date and time", "imaging date and time", and "repair date and time".

The "specifications" include at least one of elapsed years, a structural form, a member name, or a material.

Examples of the elapsed years include the number of years elapsed from a completion date or an opening date.

Examples of the structural form include a girder bridge, a rigid-frame bridge, a truss bridge, an arch bridge, a cable-stayed bridge, or a suspension bridge in a case of a bridge.

Examples of the member name include a slab, a pier, an abutment, or a girder in a case of a bridge.

Examples of the material include steel, reinforced concrete, or prestressed concrete (PC).

The "damage information" includes at least one of a damage type, a degree of damage, a soundness degree, or a countermeasure category.

Examples of the damage type include a type of damage that occurs in the structure, such as cracking (fissuring), water leakage, corrosion, breakage, or stripping.

The degree of damage is information indicating an objective state of the damage for each type of damage, and is classified according to the size, depth, and type and displayed, for example, as a to d.

Examples of an indicator of the soundness degree include an indicator showing four-level diagnosis results of I to IV, as described in inspection guidelines established by the Japanese Ministry of Land, Infrastructure, Transport and Tourism.

Examples of the countermeasure category include a countermeasure category described in inspection guidelines established by the Japanese Ministry of Land, Infrastructure, Transport and Tourism.

Examples of the "repair information" include, for example, past repair contents.

Examples of the "peripheral information" include a traffic volume (per day, per month, per year, cumulative, etc.) or a location (distance from the sea).

Examples of the "weather information" include an average temperature, an average humidity, a rainfall, and a snowfall.

Examples of the "statistical information" include a proportion by the type of damage or by the size of damage.

FIG. 4 illustrates a case where the database 40 is stored in the storage unit 16. However, as long as the information processing apparatus 10 can access the database 40 via a wired or wireless network, the database 40 may be stored in an external storage device.

<Information Processing Method>

Figure 5:
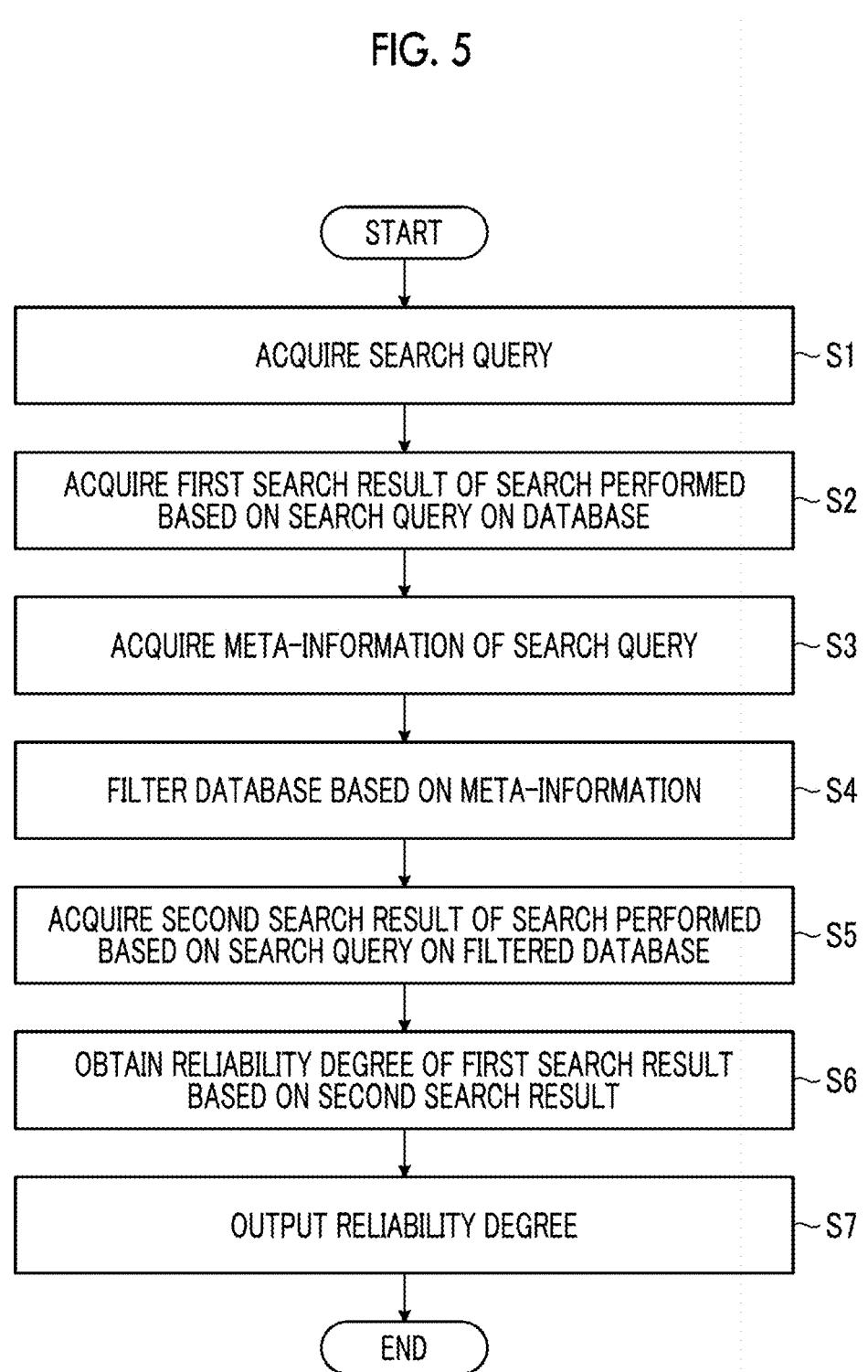
FIG. 5 is a flowchart showing an information processing method.

FIG. 5 is a flowchart showing an information processing method using the information processing apparatus 10. As shown in FIG. 5, the information processing method comprises, as an example, a step of acquiring a search query (step S1), a step of acquiring a first search result (step S2), a step of acquiring meta-information of the search query (step S3), a step of filtering the database based on the meta-information (step S4), a step of acquiring a second search result (step S5), a step of obtaining a reliability degree of the first search result based on the second search result (step S6), and a step of outputting the reliability degree (step S7).

6

<Step of Acquiring Search Query>

In the step of acquiring the search query (step S1), the search query acquisition unit 51 acquires the search query. The user inputs the search query into the information processing apparatus 10 via the operation unit 18, for example. In this case, the search query is created by the user based on the inspection result of the structure 1. Then, the search query acquisition unit 51 acquires the search query. In addition, as another method, the user may create the search query by using the mobile terminal 5. Further, as still another method, the search query may be automatically created from the inspection result. Here, the search query includes information for specifying a search target and is a type of processing request to the information processing apparatus 10.

The search query can include, for example, text data and/or image data. In a case where the structure 1 is the target, the search query includes at least one selected from the group of "specifications", "damage information", "repair information", "peripheral information", "weather information", "statistical information", and "damage image". The "specifications", the "damage information", the "repair information", the "peripheral information", the "weather information", and the "statistical information" are examples of the text data, and the "damage image" is an example of the image data. The search query is not limited to the above-described text data and/or image data.

It is preferable that the image data and the text data included in the search query are of the same type as the image data 43 and the text data 42 included in the inspection data 41.

Figure 6:
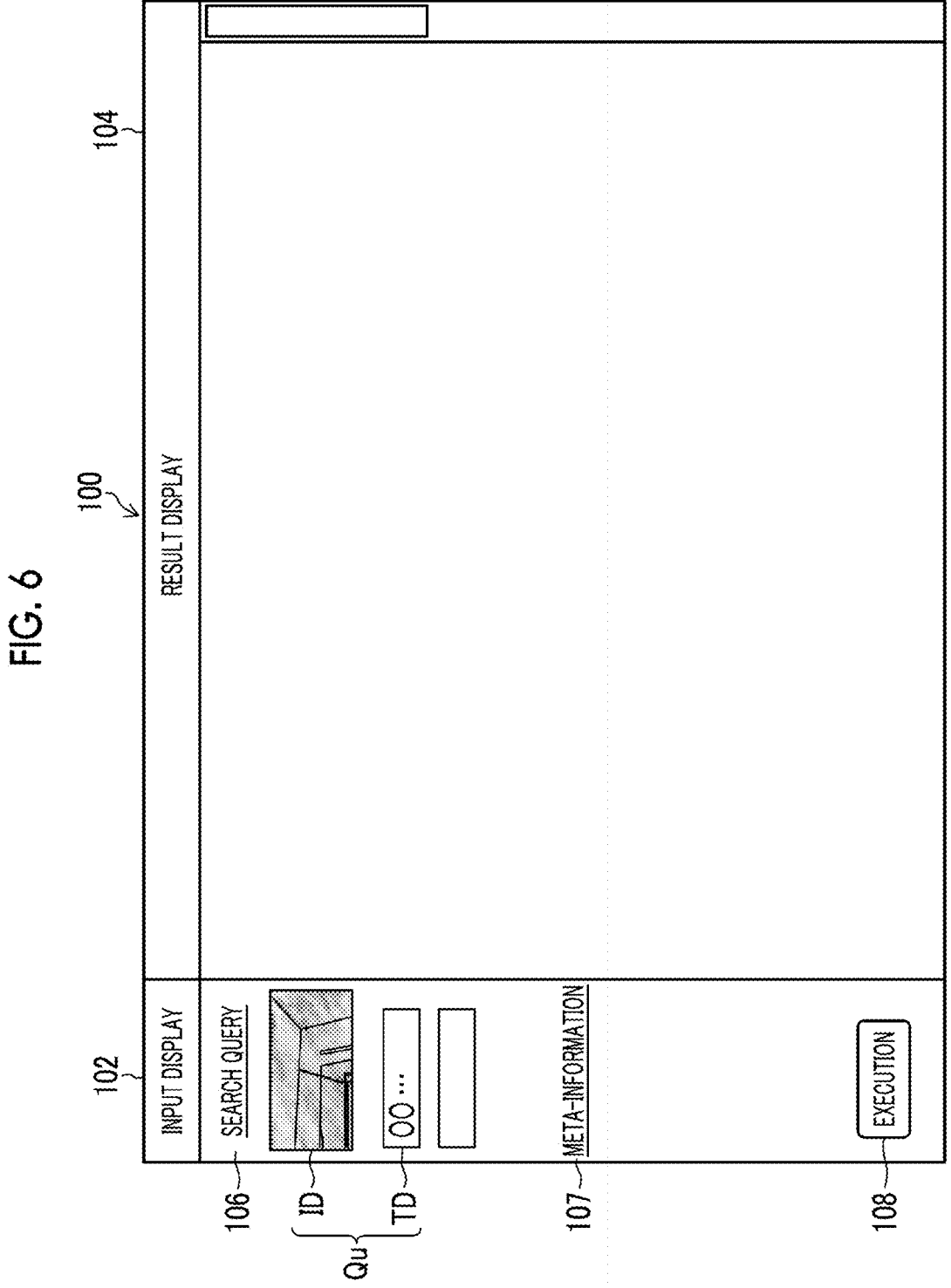
FIG. 6 is a diagram for describing an example of a display screen on which a search query is displayed.

FIG. 6 shows an example of a display screen on which the search query is displayed. A display screen 100 shown in FIG. 6 is displayed on the display device 30 under the control of the display control unit 26. The display screen 100 includes an input display screen 102 and a result display screen 104.

The input display screen 102 displays a search query Qu acquired by the search query acquisition unit 51 and displays characters "search query" in a type area 106. In a case where the search query Qu includes image data, image data ID is displayed on the input display screen 102, and the user can confirm the image data ID. In a case where the search query Qu includes text data, text data TD is displayed on the input display screen 102, and the user can confirm the text data TD. The user can input the search query Qu (image data ID and/or text data TD) from the input display screen 102, and the input search query Qu is acquired by the search query acquisition unit 51.

The input display screen 102 shown in FIG. 6 can display or input meta-information which will be described below. In an area where the meta-information is displayed or input, characters "meta-information" are displayed in a type area 107.

The input display screen 102 includes an execution button 108. In a case where the execution button 108 is operated, the process proceeds to a next step. In FIG. 6, a processing flow proceeds to step S2 of acquiring the first search result.

<Step of Acquiring First Search Result>

Figure 7:
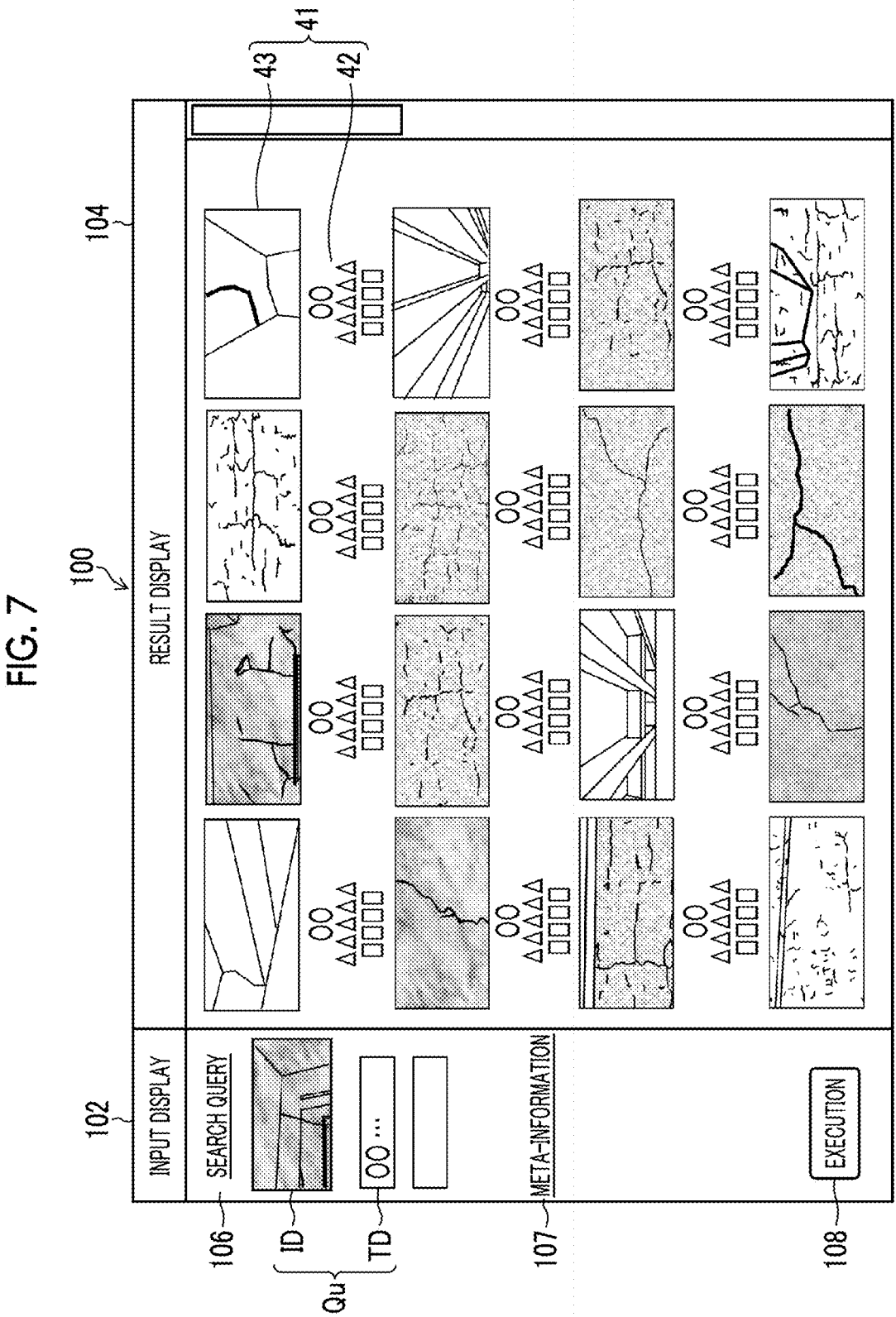
FIG. 7 is a diagram for describing an example of a display screen on which a first search result is displayed.

In the step of acquiring the first search result (step S2), the first search result acquisition unit 52 acquires the first search result of search performed based on the search query Qu on the database 40. As shown in FIG. 7, for example, the first search result acquisition unit 52 acquires the inspection data 41 of inspection performed based on the search query Qu on the database 40. The acquired inspection data 41 is an example of the first search result. In FIG. 7, the search query Qu including the text data TD and the image data ID is displayed. The search query Qu need only include at least one of the text data TD or the image data ID.

In a case where the search query Qu includes the image data ID, the first search result acquisition unit 52 acquires the image data 43 from the database 40 based on the image data ID. The first search result acquisition unit 52 calculates feature amounts of the image data ID and the image data 43 using an image recognition algorithm, a machine learning model, or the like. Next, the first search result acquisition unit 52 compares the feature amount of the image data ID with the feature amount of the image data 43 and acquires the image data 43 corresponding to the image data ID as the first search result of search performed based on the search query Qu.

In a case where the search query Qu includes the text data TD, the first search result acquisition unit 52 acquires the text data 42 from the database 40 based on the text data TD. The first search result acquisition unit 52 compares the text data TD with the text data 42 using a text search algorithm, a machine learning model, or the like and acquires the text data 42 corresponding to the text data TD of the search query Qu as the first search result of search performed based on the search query Qu.

In addition, processing performed based on the search query referred to in the present specification means that some processing is performed on the database 40 by using information on the search query, and includes, for example, a search. The search includes concepts such as "match", "similarity", "dissimilarity", and "evaluation" (for example, "ascending order" or "descending order").

As shown in FIG. 7, the first search result obtained by the first search result acquisition unit 52 is displayed on the result display screen 104 under the control of the display control unit 26. In a case where the search query Qu is the image data ID, the image data 43 corresponding to the image data ID is displayed on the result display screen 104. In addition, the text data 42 associated with the image data 43 on the database 40 is also displayed.

In a case where the search query Qu is the text data TD, the text data 42 corresponding to the text data TD is displayed on the result display screen 104. In addition, the image data 43 associated with the text data 42 on the database 40 is also displayed.

Although FIG. 7 shows the image data ID and the text data TD as the search query Qu, as described above, the search query Qu need only include at least one of the image data ID or the text data TD. In addition, the first search result acquisition unit 52 may acquire the first search result of search performed based on the search query that combines the image data ID and the text data TD.

For example, a technique described in WO2020/071216A, WO2020/255227A, JP2018-165926A, or JP2017-167987A may be applied to the acquisition of the first search result.

Next, the processing flow proceeds to step S3 of acquiring the meta-information of the search query Qu.

<Step of Acquiring Meta-Information of Search Query>

Figure 8:
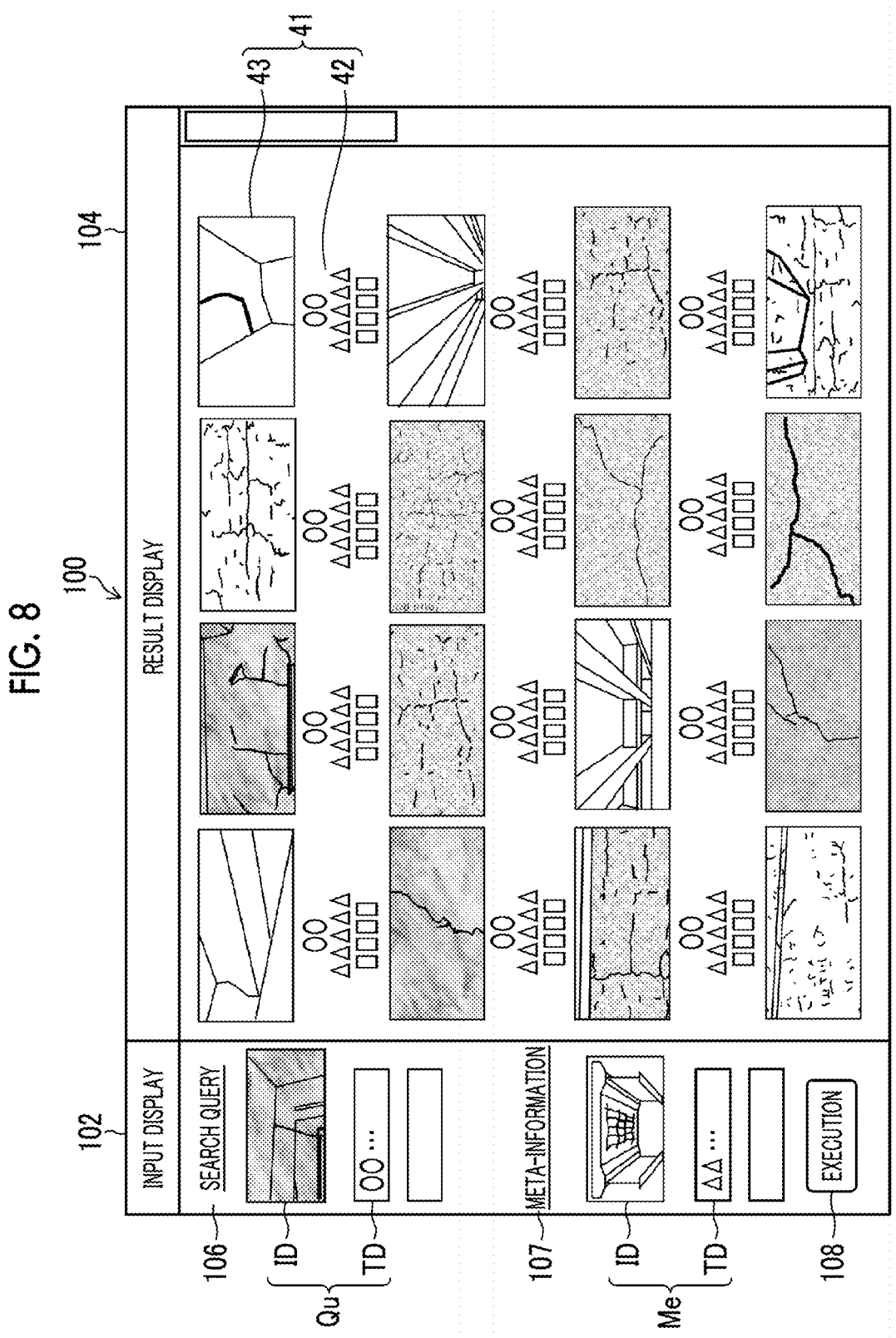
FIG. 8 is a diagram for describing an example of a display screen on which meta-information is displayed.

In the step of acquiring the meta-information of the search query Qu (step S3), the meta-information acquisition unit 53 acquires the meta-information of the search query Qu. FIG. 8 shows an example of the display screen 100 on which meta-information Me is displayed, and the acquired meta-information Me is displayed on the input display screen 102. In FIG. 8, the first search result acquired in step S2 is displayed on the result display screen 104.

Similarly to the search query Qu, the meta-information Me can include the text data TD and/or the image data ID and includes, for example, at least one selected from the group of "specifications", "damage information", "repair information", "peripheral information", "weather information", "statistical information", and "damage image". The "specifications", the "damage information", the "repair information", the "peripheral information", the "weather information", and the "statistical information" are examples of the text data TD, and the "damage image" is an example of the image data ID. The search query Qu and the meta-information Me can include the same type of the image data ID and the text data TD. Note that the information included in the meta-information Me is not limited to these. In FIG. 8, the meta-information Me including the text data TD and the image data ID is displayed. Note that the meta-information Me need only include either the text data TD or the image data ID.

Here, the meta-information Me is not the search query Qu itself but information that is related to the search query Qu.

Next, combinations of the search query Qu and the meta-information Me will be shown. Table 1 shows an example of the combinations of the search query Qu and the meta-information Me. In a case where the target is a structure, the following combinations can be exemplified. No. 1 shows that the search query Qu is the image data (damage image) and the meta-information Me is the text data (specifications, damage information, repair information, statistical information, and the like). No. 2 shows that the search query Qu is the text data (specifications, damage information, repair information, statistical information, and the like) and the meta-information Me is the image data (damage image). No. 3 shows that the search query Qu is the image data (damage image) and the meta-information Me is the image data (damage image). In No. 3, in a case where the search query Qu and the meta-information Me each include a damage image as the image data, the damage image different from the search query Qu is applied as the damage image of the meta-information Me. As the damage image of the meta-information Me, an image completely different from the search query Qu, a past image, a slightly processed image, or an image captured from a remote place can be exemplified.

Table 1 is an example of the combinations of the search query Qu and the meta-information Me, but the combinations are not limited thereto.

TABLE 1

| No | Search query Qu | Meta-information Me |
|---|---|---|
| 1 | Image data Damage image | Text data Specifications, Damage information, Repair information, Statistical information, etc. |
| 2 | Text data Specifications, Damage information, Repair information, Statistical information, etc. | Image data Damage image |
| 3 | Image data Damage image | Image data Damage image different from search query (Example: Completely different image, Past image, Slightly processed image) |

The meta-information acquisition unit 53 can automatically acquire the meta-information Me of the search query Qu. For example, in a case where the search query Qu is the image data, an exchangeable image file format (Exif) is automatically acquired as the meta-information Me by the meta-information acquisition unit 53. The Exif is information attached to the image data during imaging and includes information such as circumstances and settings during imaging. Further, in a case where the image data of the search query Qu is captured in a GPS reception environment, the meta-information Me may include positional information, latitude and longitude, or altitude.

In addition, in a case where the image data of the search query Qu is a "damage image", the meta-information Me can be acquired by using a machine-learned learning model. For example, the "damage information" can be specified by the learning model based on the "damage image" of the search query Qu. The specified "damage information" is acquired as the meta-information Me by the meta-information acquisition unit 53.

The meta-information Me can be manually input into the information processing apparatus 10 by the user. FIG. 8 is an example of a display screen showing an input example of the meta-information Me. The display screen 100 of FIG. 8 can execute the confirmation of the acquired meta-information Me and the input of the meta-information Me. That is, the user can manually input the image data ID and/or the text data TD as the meta-information Me onto the input display screen 102 of the display screen 100. The input meta-information Me is acquired by the meta-information acquisition unit 53. FIG. 8 shows a case where the image data ID and the text data TD are input as the meta-information Me, and the image data ID and the text data TD are displayed. The user can input either the text data TD or the image data ID as the meta-information Mc.

In a case where the user manually inputs the meta-information Me, the user associates the search query Qu and the meta-information Me with each other. For example, in a case where the meta-information Me is input, the user displays the search query Qu on the input display screen 102 and performs processing to associate the meta-information Me with the search query Qu, so that the search query Qu and the meta-information Me are associated. The user can optionally associate the search query Qu with the meta-information Me.

Even in a case where the meta-information Me is automatically acquired, the input display screen 102 can display the meta-information Me under the control of the display control unit 26, and the user can confirm the meta-information Me.

In a case where the execution button 108 of the input display screen 102 is operated, the processing flow proceeds to step S4 of filtering the database 40. Further, the processing flow can proceed to step S5 of acquiring the second search result after step S4.

<Step of Filtering Database>

In the step of filtering the database (step S4), the filtering unit 54 executes filtering on the database 40 based on the meta-information Me.

The filtering unit 54 filters the database 40 based on the image data ID or the text data TD included in the meta-information Me. The filtering unit 54 compares the text data TD or the image data ID of the meta-information Me with the text data 42 or the image data 43 of the database 40.

In a case where the meta-information Me is the text data TD, the filtering unit 54 can filter the database 40 by, for example, extracting only the text data 42 that is the same as the text data TD of the meta-information Me or extracting other data.

In addition, the filtering unit 54 can filter the database 40 according to an analysis result of the meta-information Me. For example, in a case where the meta-information Me is the damage type, the filtering unit 54 can calculate a proportion of the damage type as the analysis result and compare the proportion of the damage type with the statistical information of the proportion of the damage type in the database 40 to filter the database 40 accordingly. In addition, in a case where the meta-information is a size of the damage type, the filtering unit 54 can calculate a proportion of the size of the damage type as the analysis result and compare the proportion of the size of the damage type with the statistical information of the proportion of the size of the damage type from the database 40 to filter the database 40. These filtering methods are examples of filtering.

In addition, the filtering unit 54 may filter the database 40 in a stepwise manner. For example, in a case where the meta-information Me includes a plurality of types of text data TD, the filtering unit 54 can perform filtering with the "elapsed years" and further perform filtering with the "member name". The stepwise filtering is not particularly limited.

As a result of the filtering, there are a case where a population parameter of the database 40 is narrowed down and a case where the population parameter is not narrowed down.

The processing flow proceeds to step S5 of acquiring the second search result.

<Step of Acquiring Second Search Result>

In the step of acquiring the second search result (step S5), the second search result acquisition unit 55 acquires the second search result of search performed based on the search query on the filtered database 40. The second search result acquisition unit 55 acquires, for example, the inspection data 41 of inspection performed based on the search query on the filtered database 40.

A different point between the acquisition of the second search result of search performed based on the search query by the second search result acquisition unit 55 and the acquisition of the first search result of search performed based on the search query by the first search result acquisition unit 52 is that the second search result acquisition unit 55 targets the filtered database 40, whereas the first search result acquisition unit 52 targets the database 40 before filtering. Except for that point, the second search result acquisition unit 55 acquires the second search result using the same method as the first search result acquisition unit 52.

Figure 9:
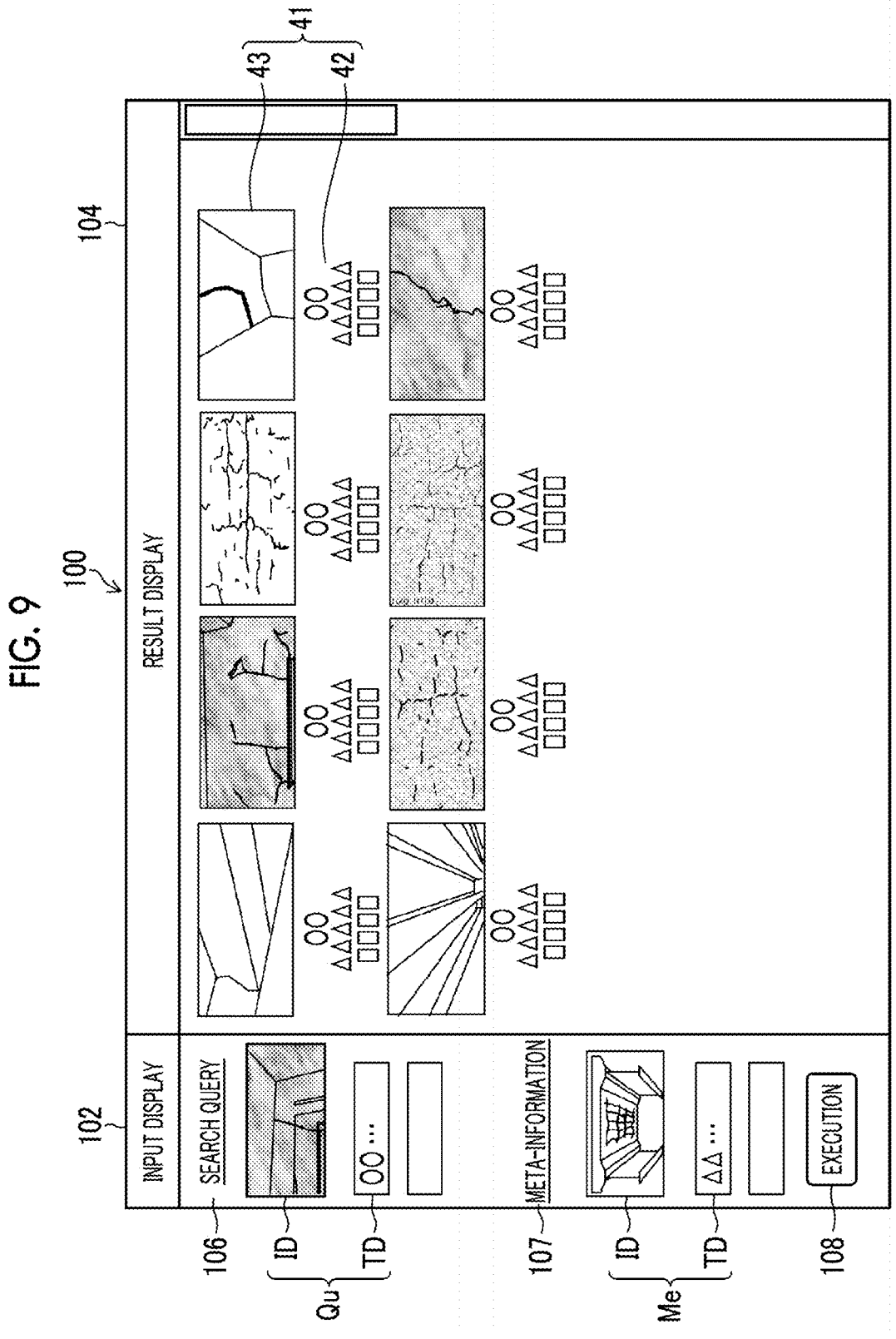
FIG. 9 is a diagram for describing an example of a display screen on which a second search result is displayed.

FIG. 9 is an example of a case where the second search result is displayed on the result display screen 104. As shown in FIG. 9, the second search result obtained by the second search result acquisition unit 55 is displayed on the result display screen 104 under the control of the display control unit 26. FIG. 9 shows an example of the second search result according to the present invention. For example, in a case of comparing the second search result shown in FIG. 9 with the first search result shown in FIG. 7, the displayed results differ because the database 40 is filtered.

Next, in a case where the execution button 108 is operated, the processing flow proceeds to step S6 of obtaining the reliability degree, and the reliability degree calculation unit 56 calculates the reliability degree of the first search result.

Although FIG. 9 shows a case where the second search result is displayed on the display screen 100, the second search result may not be displayed on the display screen 100. That is, the processing flow may proceed to step S6 of executing reliability degree processing to obtain the reliability degree of the first search result after step S5 of acquiring the second search result.

<Step of Obtaining Reliability Degree of First Search Result>

In the step of obtaining the reliability degree of the first search result (step S6), the reliability degree calculation unit 56 obtains the reliability degree of the first search result based on the second search result. By obtaining the reliability degree of the first search result, it is possible to improve an accuracy of the first search result.

A preferred aspect of a method of obtaining the reliability degree will be described. The reliability degree calculation unit 56 decides an application condition of the first search result and an application condition of the second search result, respectively, in order to obtain the reliability degree. The reliability degree calculation unit 56 can obtain the reliability degree from each of the application conditions.

Figure 10A:
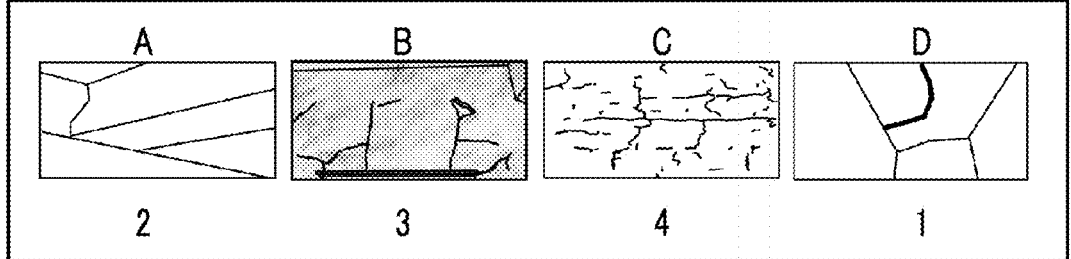
FIGS. 10A and 10B are diagrams for describing examples of a method for obtaining a reliability degree.
Figure 10B:
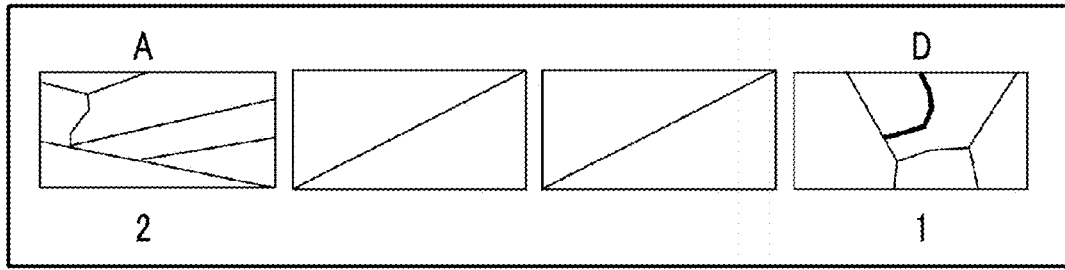

For example, the reliability degree calculation unit 56 decides an index (so-called similarity rank) of the database 40 for the first search result and the second search result as the application condition for obtaining the reliability degree. FIGS. 10A and 10B are diagrams conceptually illustrating cases where the index is the target. FIG. 10A shows an example of the first search result, and four data A, B, C, and D are acquired from the database 40 as the first search result. The four data A to D indicate the similarity ranks for the search query in numerical values. The smaller the numerical value, the more similar it is to the search query. That is, the first search result indicates that the search result is similar to the search query in the order of D, A, B, and C.

FIG. 10B shows an example of the second search result. In the second search result, two data A and D are acquired from the filtered database 40. The two data A and D indicate the similarity ranks for the search query in numerical values. That is, the second search result indicates that the search result is similar to the search query in the order of D and A.

The reliability degree calculation unit 56 obtains the reliability degree of the first search result (including the index) based on the second search result (including the index). For example, in the examples of FIGS. 10A and 10B, the order of D and A in the second search result matches the order of D and A in the first search result, and the reliability degree calculation unit 56 calculates that the reliability degree of the first search result is 100%.

In addition, from another viewpoint, the reliability degree calculation unit 56 can use the top N (N is a natural number) results of the first search result and the top N (N is a natural number) results of the second search result as the application conditions. In this case, the meta-information accompanying the search result may also be included. The reliability degree calculation unit 56 can obtain the reliability degree of the first search result (including the top N results) based on the second search result (including the top N results).

The reliability degree calculation unit 56 may calculate a similarity or a distance in the process of obtaining the reliability degree. The reliability degree calculation unit 56 can obtain the similarity or the distance by applying a method selected from the group of cosine similarity, deviation pattern similarity, Jaccard coefficient, Dice coefficient, Simpson coefficient, Pearson correlation coefficient, Spearman correlation coefficient, Earth Mover's Distance, Euclidean distance, weighted Euclidean distance, Hamming distance, Mahalanobis distance, or Canberra distance. The method shown here is a known technique, so the description thereof will be omitted.

In addition, in a case where the first search result (including the top N results) is used as the application condition based on the second search result (including the top N results), the reliability degree calculation unit 56 can obtain the statistical information for the first search result or the second search result based on the first search result or the second search result and determine whether the statistical information is within a range of a threshold value to obtain the reliability degree.

As the statistical information, the reliability degree calculation unit 56 calculates a proportion in which specific information included in the top N of the second search result is included in the top N of the first search result. The reliability degree calculation unit 56 can determine whether the proportion is within a preset threshold value and finally obtain the reliability degree.

As the statistical information, the reliability degree calculation unit 56 calculates a proportion in which specific information included in the top N of the first search result is included in the top N of the second search result. The reliability degree calculation unit 56 can determine whether the proportion is within a preset threshold value and finally obtain the reliability degree.

In a case where the reliability degree is obtained by the reliability degree calculation unit 56, the processing flow proceeds to step S7 of outputting the reliability degree.

<Step of Outputting Reliability Degree>

Figure 11:
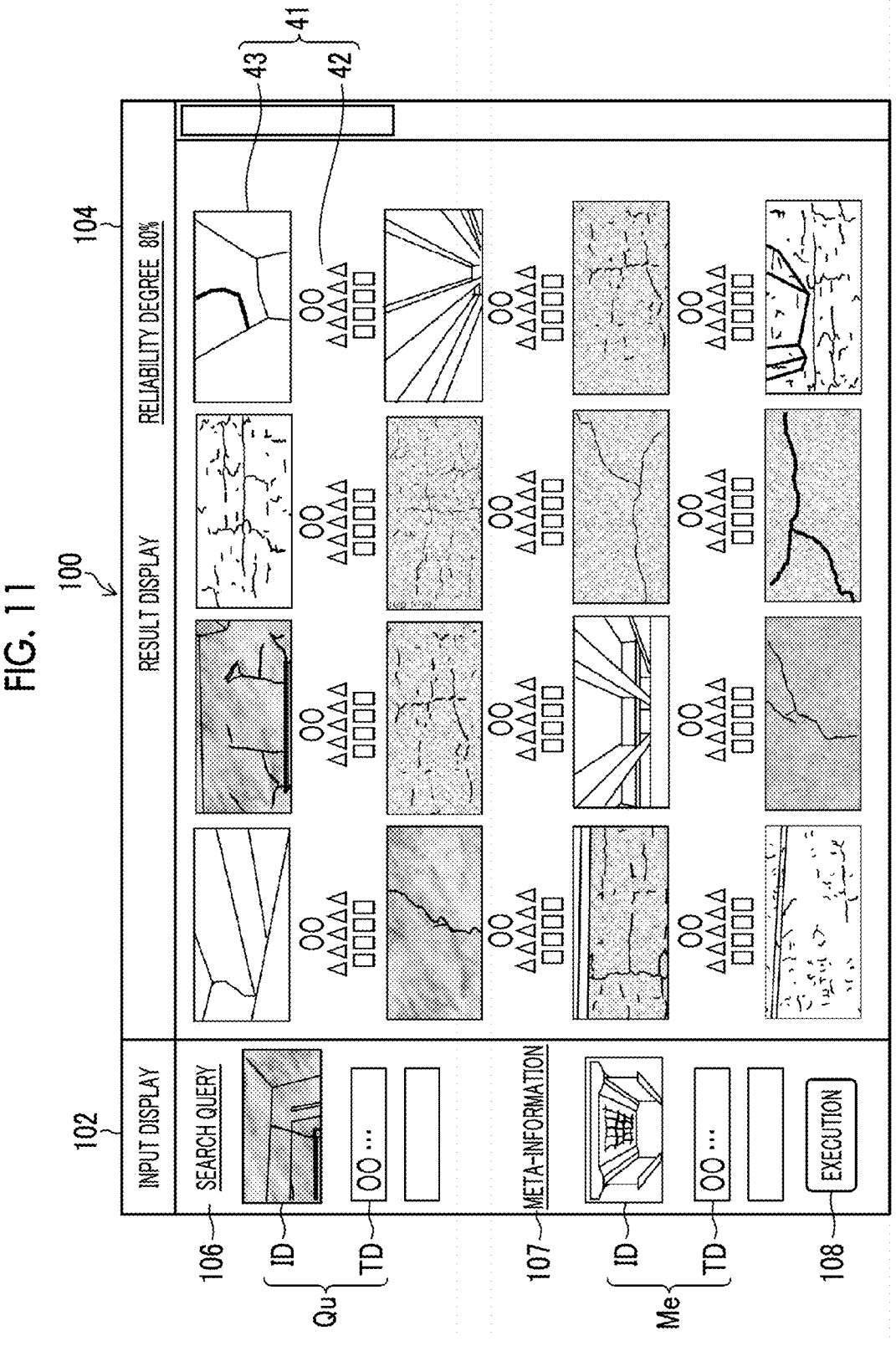
FIG. 11 is a diagram for describing an example of a display screen on which the reliability degree is displayed.

In the step of outputting the reliability degree (step S7), the output unit 57 outputs the reliability degree to the display device 30 via the display control unit 26. FIG. 11 is an example of the display screen to which the reliability degree is output. As shown in FIG. 11, the reliability degree is displayed in a field of the result display screen 104. In FIG. 11, the reliability degree and the first search result are displayed on the display device 30 at the same time. Since the reliability degree for the first search result is displayed, the user can determine whether the past inspection result can be used from the first search result with reference to the reliability degree.

Although a case has been illustrated where the output unit 57 displays the reliability degree on the display device 30, the output unit 57 can also output the reliability degree to a printer and as electronic data in various data formats.

The processing flow ends in a case where the output unit 57 outputs the reliability degree.

PREFERRED EMBODIMENTS

Hereinafter, preferred embodiments will be described.

First Embodiment

In a first embodiment, the reliability degree is compared with a preset threshold value X, and the processing flow is executed while changing the search query until the reliability degree satisfies the threshold value X.

In the example of FIG. 11, the display screen 100 displays that the reliability degree is 80%. The user can determine that the reliability degree of the first search result is high. On the other hand, a case is also conceivable in which the reliability degree calculation unit 56 calculates the reliability degree of the first search result as 20%.

In this respect, the reliability degree calculation unit 56 can determine whether the reliability degree is equal to or higher than the preset threshold value X and execute the processing flow according to the reliability degree.

Figure 12:
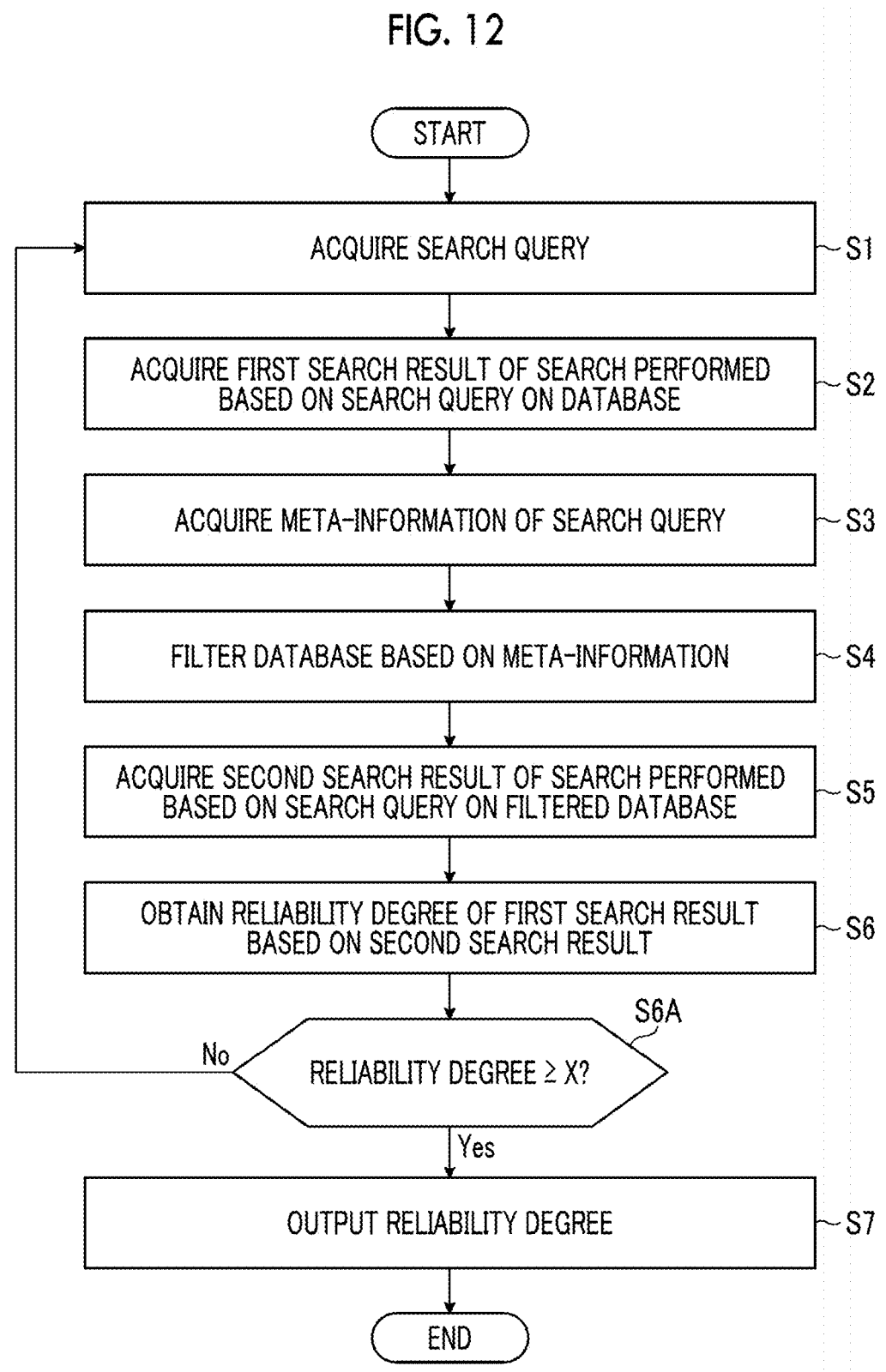
FIG. 12 is a flowchart showing a first embodiment.

FIG. 12 is a flowchart of the first embodiment, and step S6A of determining the reliability degree is added to the flow of FIG. 5. Differences from FIG. 5 will be mainly described.

As described above, the CPU 20 of the information processing apparatus 10 executes steps S1 to S6. In a case where the reliability degree calculation unit 56 obtains the reliability degree, the processing flow proceeds to the determination step (step S6A). In step S6A, it is determined whether the reliability degree is equal to or higher than the preset threshold value X.

In a case where it is determined that the reliability degree is smaller than the threshold value X, that is, in a case of "No" in step S6A, the processing flow proceeds to the step of acquiring the search query (step S1). In the step of acquiring the search query (step S1), the search query for which it is determined that the reliability degree of the first search result does not satisfy the threshold value X is changed. The changed search query is acquired by the search query acquisition unit 51, and steps S1 to S6A are repeated until the reliability degree is determined to be equal to or higher than the threshold value X.

In a case where the search query is the image data, the change of the search query can be exemplified by, for example, changing the image data to one captured from a different angle. The change of the search query can be performed automatically or manually. Note that the change of the search query is not limited to this example.

In a case where it is determined that the reliability degree is equal to or higher than the threshold value X, that is, in a case of "Yes" in step S6A, the processing proceeds to the step of outputting the reliability degree (step S7), and the processing flow ends in a case where the output unit 57 outputs the reliability degree.

In the first embodiment, since the first search result of the reliability degree equal to or higher than the threshold value X is output, the user can use the past inspection result based on the first search result with reference to the reliability degree.

Second Embodiment

In a second embodiment, the accuracy of the first search result can be improved by feeding back the reliability degree result to the acquisition of the first search result.

Figure 13:
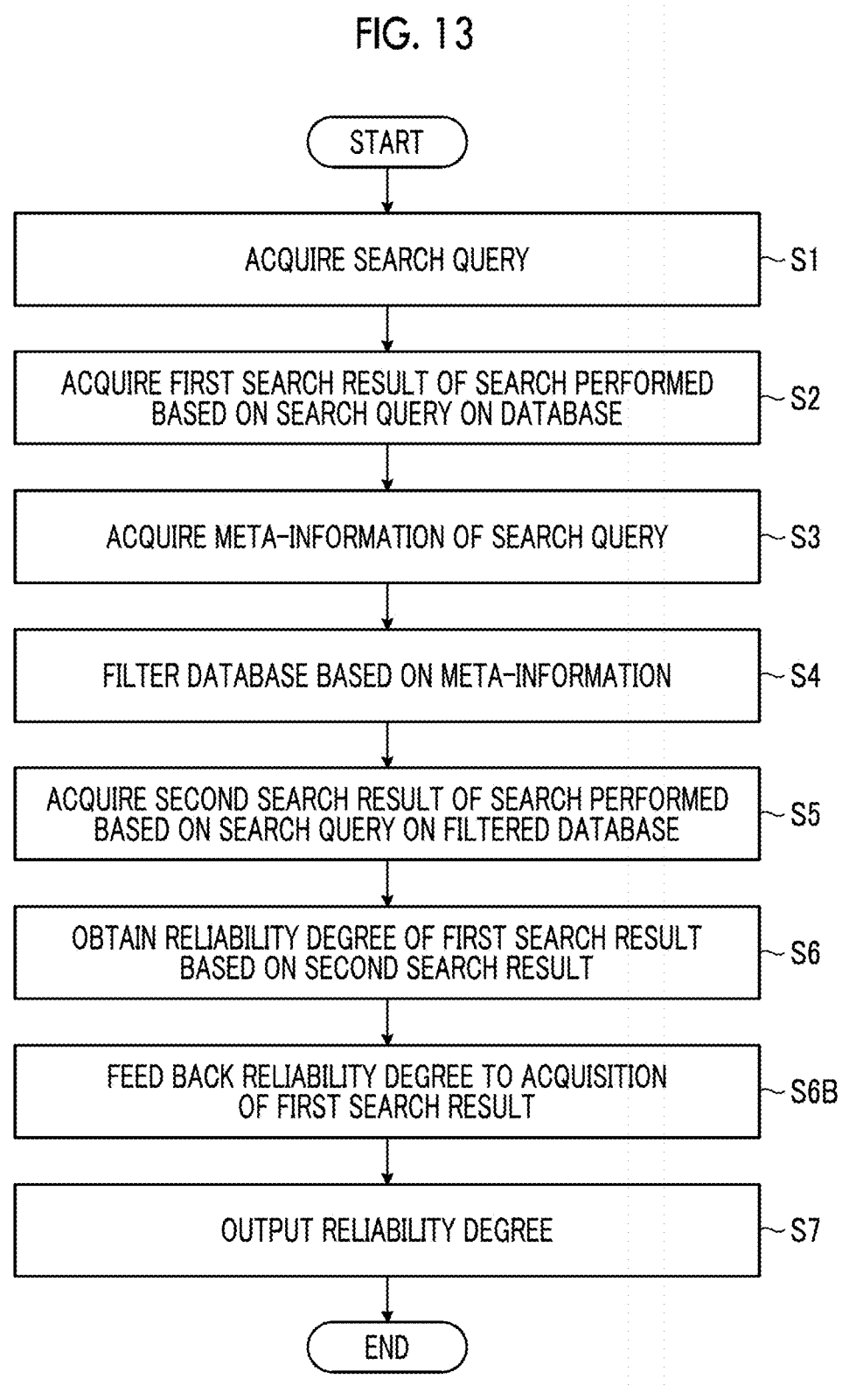
FIG. 13 is a flowchart showing a second embodiment.

FIG. 13 is a flowchart of the second embodiment and shows a flow in which step S6B of feeding back the result of the reliability degree to the acquisition of the first search result is added. Differences from FIG. 5 will be mainly described.

As described above, the CPU 20 of the information processing apparatus 10 executes steps S1 to S6. In a case where the reliability degree calculation unit 56 obtains the reliability degree, the processing flow proceeds to the step of feeding back the result of the reliability degree to the acquisition of the first search result (step S6B).

In a case where the first search result acquisition unit 52 uses a machine learning model, parameters of the machine learning model may be optimized through machine learning by using the first search result and the second search result as training data. The accuracy of the first search result acquired by the first search result acquisition unit 52 is improved by using the optimized machine learning model.

The method of feeding back the result of the reliability degree to the acquisition of the first search result is not limited to the above method.
<Others>

In the embodiments, a hardware structure of a processing unit that executes various processing is the following various processors. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be configured by one of these various processors, or may be configured by two or more same type or different types of processors (for example, a plurality of FPGAs or a combination of the CPU and the FPGA). Moreover, a plurality of processing units can be configured by one processor. As an example of configuring the plurality of processing units by one processor, first, there is a form in which one processor is configured by a combination of one or more CPUs and software, as represented by a computer such as a client or a server, and the one processor functions as the plurality of processing units. Second, as represented by a system on chip (SoC) or the like, there is a form of using a processor that realizes, by one integrated circuit (IC) chip, functions of the entire system including the plurality of processing units. As described above, the various processing units are configured using one or more of the above various processors as a hardware structure.

Further, as the hardware structure of the various processors, more specifically, an electric circuit (circuitry) in which circuit elements such as semiconductor elements are combined may be used.

Each of the configurations and functions described above can be appropriately realized by using any hardware, software, or a combination of both. For example, the present invention can also be applied to a program for causing a computer to execute the above-described processing steps (processing procedures), a computer-readable storage medium (non-transitory storage medium) in which such a program is stored, or a computer on which such a program can be installed.

Although examples of the present invention have been described above, it goes without saying that the present invention is not limited to the above-described embodiment and various modifications can be made without departing from the scope of the present invention.

EXPLANATION OF REFERENCES

1: structure
3: camera
5: mobile terminal
10: information processing apparatus
12: input/output interface
16: storage unit
18: operation unit
20: CPU
22: RAM
24: ROM
26: display control unit
30: display device
40: database
41: inspection data
42: text data
43: image data
51: search query acquisition unit
52: first search result acquisition unit
53: meta-information acquisition unit
54: filtering unit
55: second search result acquisition unit
56: reliability degree calculation unit 57: output unit
100: display screen
102 Input display screen
104 result display screen
106: type area
107: type area
108: execution button
ID: image data
TD: text data
Me: meta-information
Qu: search query

What is claimed is:

1. An information processing apparatus comprising a processor,
   wherein the processor is configured to:
   acquire a search query comprising a first image data;
   acquire a second image data from a database based on the first image data;
   determine a feature amount of the first image data and a feature amount of the second image data;
   acquire a first search result of search performed based on the first image data of the search query on the database by comparing the feature amount of the first image data with the feature amount of the second image data;
   acquire meta-information of the search query, wherein the meta-information is information related to the first image data of the search query;
   filter the database based on the meta-information related to the first image data to generate a filtered database by comparing the meta-information with the second image data of the database;
   acquire a second search result of search performed based on the search query on the filtered database; and
   obtain a reliability degree of the first search result based on the second search result.

2. The information processing apparatus according to claim 1,
   wherein the processor is configured to acquire the second search result of search performed based on the search query on the database which is filtered stepwise by the meta-information.

3. The information processing apparatus according to claim 1,
   wherein the processor is configured to calculate a similarity in a case of obtaining the reliability degree.

4. The information processing apparatus according to claim 3,
   wherein the processor is configured to, in a case of obtaining the reliability degree, calculate the similarity based on a method selected from the group of cosine similarity, deviation pattern similarity, Jaccard coefficient, Dice coefficient, Simpson coefficient, Pearson correlation coefficient, Spearman correlation coefficient, Earth Mover's Distance, Euclidean distance, weighted Euclidean distance, Hamming distance, Mahalanobis distance, or Canberra distance.

5. The information processing apparatus according to claim 1,
   wherein the processor is configured to, in a case of obtaining the reliability degree, obtain statistical information for the first search result or the second search result based on the first search result or the second search result, and determine whether the statistical information is within a range of a threshold value.

6. The information processing apparatus according to claim 1,
   wherein the processor is configured to output the reliability degree.

7. The information processing apparatus according to claim 1,
   wherein the processor is configured to feed back the reliability degree to the acquisition of the first search result.

8. The information processing apparatus according to claim 1,
   wherein the meta-information includes information about a structure.

9. The information processing apparatus according to claim 8,
   wherein the information about the structure in the meta-information includes at least one selected from the group of a damage image, specifications, damage information, repair information, peripheral information, weather information, and statistical information.

10. The information processing apparatus according to claim 1,
    wherein the search query includes information about a structure.

11. The information processing apparatus according to claim 10,
    wherein the information about the structure in the search query includes at least one selected from the group of a damage image, specifications, damage information, repair information, peripheral information, weather information, and statistical information.

12. An information processing method executed by a processor, the method comprising:
    acquiring a search query comprising a first image data;
    acquire a second image data from a database based on the first image data;
    determine a feature amount of the first image data and a feature amount of the second image data;
    acquiring a first search result of search performed based on the first image data of the search query on the database by comparing the feature amount of the first image data with the feature amount of the second image data;
    acquiring meta-information of the search query, wherein the meta-information is information related to the first image data of the search query;
    filter the database based on the meta-information related to the first image data to generate a filtered database by comparing the meta-information with the second image data of the database;
    acquiring a second search result of search performed based on the search query on the filtered database; and
    obtaining a reliability degree of the first search result based on the second search result.

13. A non-transitory, computer-readable tangible recording medium on which a program for causing, when read by a computer, a processor of the computer to execute the information processing method according to claim 12 is recorded.

14. The information processing apparatus according to claim 1,
    wherein the search query further includes a first text data, and the meta-information is information related to the first text data of the search query.

15. The information processing apparatus according to claim 1,
    wherein the processor is further configured to:
    acquire a second text data from the database based on the first text data;

acquire the first search result of search performed based on the first text data of the search query on the database by comparing the first text data with the second text data; and filter the database based on the meta-information related to the first text data to generate the filtered database by comparing the meta-information with the second text data of the database.

\* \* \* \* \*